United States Patent
Ko

(10) Patent No.: US 7,242,974 B2
(45) Date of Patent: Jul. 10, 2007

(54) METHOD AND DEVICE FOR CONTROLLING OPENING/CLOSING OF A SUB-BODY IN AN AUTOMATICALLY AND MANUALLY FOLDED PORTABLE WIRELESS TERMINAL

(75) Inventor: Moon-Jung Ko, Suwon-Kyonggi-do (KR)

(73) Assignee: Samsung Electronics Co., Ltd. (KR)

( * ) Notice: Subject to any disclaimer, the term of this patent is extended or adjusted under 35 U.S.C. 154(b) by 373 days.

(21) Appl. No.: 09/853,102

(22) Filed: May 10, 2001

(65) Prior Publication Data

US 2002/0090970 A1    Jul. 11, 2002

(30) Foreign Application Priority Data

Nov. 23, 2000    (KR) .................. 10-2000-0070024

(51) Int. Cl.
*H04M 1/00* (2006.01)
(52) U.S. Cl. .................. 455/575.3; 455/550.1; 455/575.1; 455/90.3; 455/347
(58) Field of Classification Search ............ 455/550.1, 455/575.1, 575.3–575.4, 575.8, 90.1, 90.3, 455/556.1, 556.2, 127.1, 178; 379/433.01, 379/433.06, 433.1, 433.11–433.13, 434, 442, 379/428.01; 361/93.1, 18, 23, 88, 91.2, 600, 361/814
See application file for complete search history.

(56) References Cited

U.S. PATENT DOCUMENTS

| | | | | | |
|---|---|---|---|---|---|
| 4,394,607 | A | * | 7/1983 | Lemirande | 318/453 |
| 4,528,608 | A | * | 7/1985 | Andersson et al. | 361/18 |
| 5,151,946 | A | * | 9/1992 | Martensson | 455/575.4 |
| 5,453,669 | A | * | 9/1995 | Nishibe et al. | 318/434 |
| 5,649,309 | A | * | 7/1997 | Wilcox et al. | 455/575.3 |
| 5,723,959 | A | * | 3/1998 | Iwata et al. | 318/447 |
| 6,130,813 | A | * | 10/2000 | Kates et al. | 361/93.1 |
| 6,163,682 | A | * | 12/2000 | Lee | 455/575.7 |
| 6,374,089 | B1 | * | 4/2002 | Till | 455/90.1 |
| 6,381,447 | B1 | * | 4/2002 | Eguchi | 455/90.1 |
| 6,542,721 | B2 | * | 4/2003 | Boesen | 455/553.1 |
| 6,628,974 | B1 | * | 9/2003 | Lim | 379/433.11 |
| 6,751,488 | B2 | * | 6/2004 | Lee | 455/575.3 |
| 2001/0041543 | A1 | * | 11/2001 | Lim | 455/90 |

* cited by examiner

*Primary Examiner*—Charles Appiah
*Assistant Examiner*—Willie J. Daniel, Jr.
(74) *Attorney, Agent, or Firm*—The Farrell Law Firm

(57) ABSTRACT

Disclosed is an apparatus and method for determining incomplete opening/closing of a sub-body of a mobile terminal due to overload when a user automatically opens/closes the sub-body, by means of an open sensor and a close sensor, and for controlling operation of the sub-body during overload condition.

7 Claims, 9 Drawing Sheets

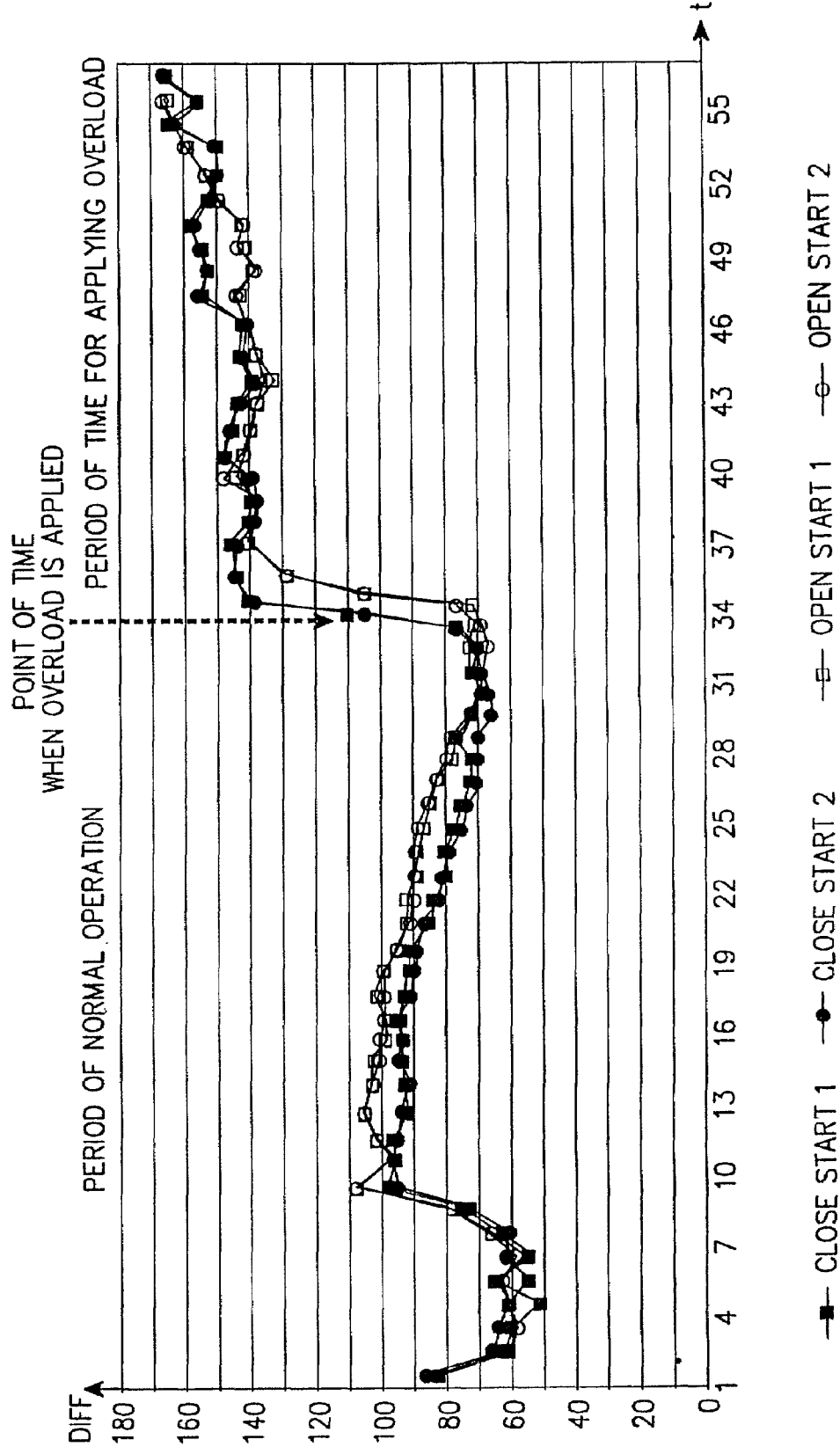

METHOD AND DEVICE FOR CONTROLLING OPENING/CLOSING OF A SUB-BODY IN AN AUTOMATICALLY AND MANUALLY FOLDED PORTABLE WIRELESS TERMINAL

PRIORITY

This application claims priority to an application entitled "Method and Device for Controlling Opening/Closure of Sub-Body in Automatically and Manually Folded Portable Wireless Terminal" filed with the Korean Industrial Property Office on Nov. 23, 2000 and assigned Serial No. 2000-70024, the contents of which are hereby incorporated by reference.

BACKGROUND OF THE INVENTION

1. Field of the Invention

The present invention relates generally to a portable wireless terminal, and in particular, to a method and a device for controlling the opening/closing of a sub-body in an automatically and manually folded portable wireless terminal.

2. Description of the Related Art

In general, portable wireless terminals are classified into bar-type terminals and foldable terminals. The bar-type terminals tend to be in less use due to an exposure of a key pad to the main body thereof, while the foldable terminals are being developed in diverse shapes owing to the sub-body attached to the main body thereof for the protection of a key pad in a foldable manner for opening and closing the terminals.

The foldable terminals are usually classified into flip-type terminals, flip-up-type terminals, and folder-type terminals. In the flip-type terminals, a flip cover functions as a sub-body to protect the key pad provided on the main body and to focus the transmitting sound. The flip-up-type terminals are characterized by a flip cover that is opened upward of the main body. In the folder-type terminals, a liquid crystal display (LCD) module is provided on the sub-body thereof.

To satisfy diverse needs of the users, automatically and manually folded portable wireless terminals are being developed in a manner that a sub-body thereof can be automatically or manually opened/closed by simple switching manipulation on a main body thereof. For automatic opening and closing, a motor is housed inside of an automatically and manually folded portable wireless terminal.

In the automatically and manually folded portable wireless terminal, the sub-body can be manually and automatically opened/closed. If efficient opening and closing of the sub-body are realized, the user convenience will be enhanced.

SUMMARY OF THE INVENTION

It is, therefore, an object of the present invention to provide a method and a device for controlling the opening/closing of a sub-body in an automatically and manually folded portable wireless terminal.

It is another object of the present invention to provide a method and a device for sensing overload of a sub-body during the opening/closing of the same.

Yet another object of the present invention is to provide a method for controlling the opening/closing of a sub-body in accordance with the overload of the sub-body.

To achieve the above objects, an automatically and manually folded portable wireless terminal is provided, including at least a sub-body installed on a main body thereof so as to be opened/closed, comprising: a first sensor for sensing a complete opening of the sub-body from the main body; a second sensor for sensing a complete closing of the sub-body onto the main body; an opening/closing device for automatically and manually opening/closing the sub-body by controlling opening/closing thereof including a motor housed inside of the sub-body for opening/closing thereof; a motor overcurrent monitoring section for monitoring whether or not an overcurrent has been applied to the motor in accordance with an overload of the motor; and a control device for controlling operation of the motor in accordance with a monitored result of the overcurrent by the motor overcurrent monitoring section under the state where incomplete opening/closing is sensed by the first and the second sensors when the opening/closing device automatically opens or closes the sub-body in accordance with a control of automatic opening/closing of the sub-body by the user.

To achieve the above objects, a method for controlling opening/closing of a sub-body in an automatically and manually folded portable wireless terminal is also provided, including at least a first sensor for sensing a complete opening of the sub-body from the main body and a second sensor for sensing a complete closing of the sub-body onto the main body, the method comprising the steps of: determining whether or not the complete opening/closing is sensed by the first and the second sensors when controlling the automatic opening/closing by the user; determining whether or not a motor housed inside of the terminal is in overloaded state during an operation thereof if incomplete opening/closing is sensed; and controlling the operation of the motor in accordance with the state of being overloaded.

BRIEF DESCRIPTION OF THE DRAWINGS

The above and other objects, features and advantages of the present invention will become more apparent from the following detailed description when taken in conjunction with the accompanying drawings, in which:

FIG. 8 is a graph illustrating a profile of a test result according to an embodiment of the present invention.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is applicable to a portable terminal constructed for both automatically and manually opening/closing a sub-body, installed to be opened from and close onto a main body in accordance with a user convenience. While an embodiment of the present invention pertains to an opening/closing device applicable to a folder-type portable terminal, it is obvious to those skilled in the art that the opening/closing device according to the present invention is easily applicable to the folded portable terminals of other types as well.

Figure 1A:
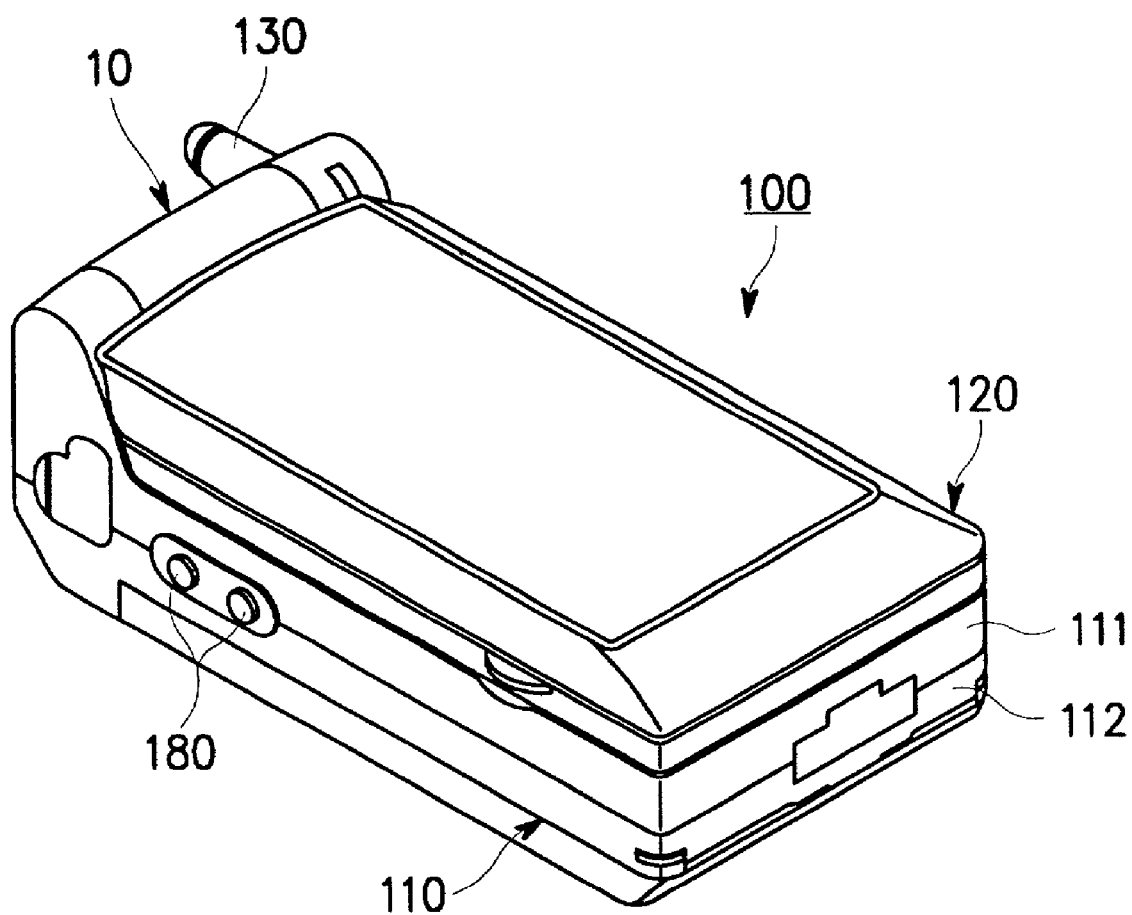
FIG. 1A is a perspective view of a sub-body of a portable wireless terminal in a state of being closed onto a main body thereof, to which the present invention is applicable.
Figure 1B:
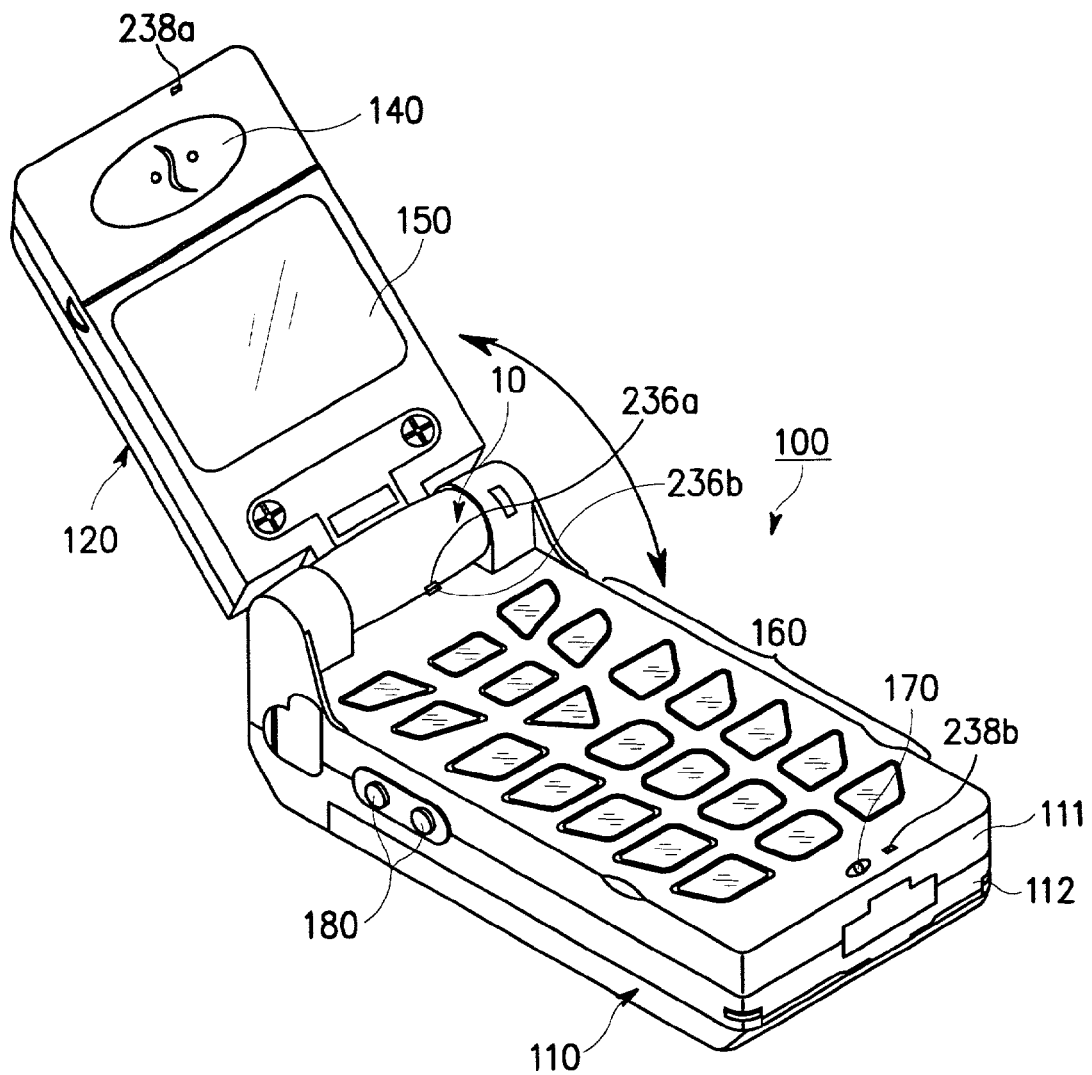
FIG. 1B is a perspective view of the sub-body of a portable wireless terminal in a state of being opened from a main body thereof, to which the present invention is applicable.

FIG. 1A is a perspective view of a sub-body 120 of a portable wireless terminal 100 in a state of being closed onto a main body 110 thereof, to which the present invention is applicable. FIG. 1B is a perspective view of the sub-body 120 of the portable wireless terminal 100 in a state of being opened from the main body 110 thereof.

Referring to FIGS. 1A and 1B, the portable wireless terminal 100 comprises the main body 110 composed of an upper casing frame 111 and a lower casing frame 112, and the sub-body 120 for protecting a key pad. An opening/closing device 10 is provided at one side of the main body 110 for automatically or manually opening/closing the sub-body 120 in accordance with a control of opening/closing by a user. An antenna 130 is mounted on one side of the top of the main body 110. An ear piece 140 is located on a surface of the sub-body that is in contact with the main body 110. An LCD module 150, which is a display device, is provided below the ear piece 140. A key pad 160 and a microphone 170 are located on the main body 110. An automatic folder opening/closing key 180 is provided on one side surface of the main body 110 for automatically opening/closing the sub-body 120 on the main body 110. If the user controls automatic opening/closing by means of the automatic folder opening/closing key 180 or manually opens/closes, the sub-body 120 is opened from or closed onto the main body 110 by the opening/closing device 10.

Figure 2:
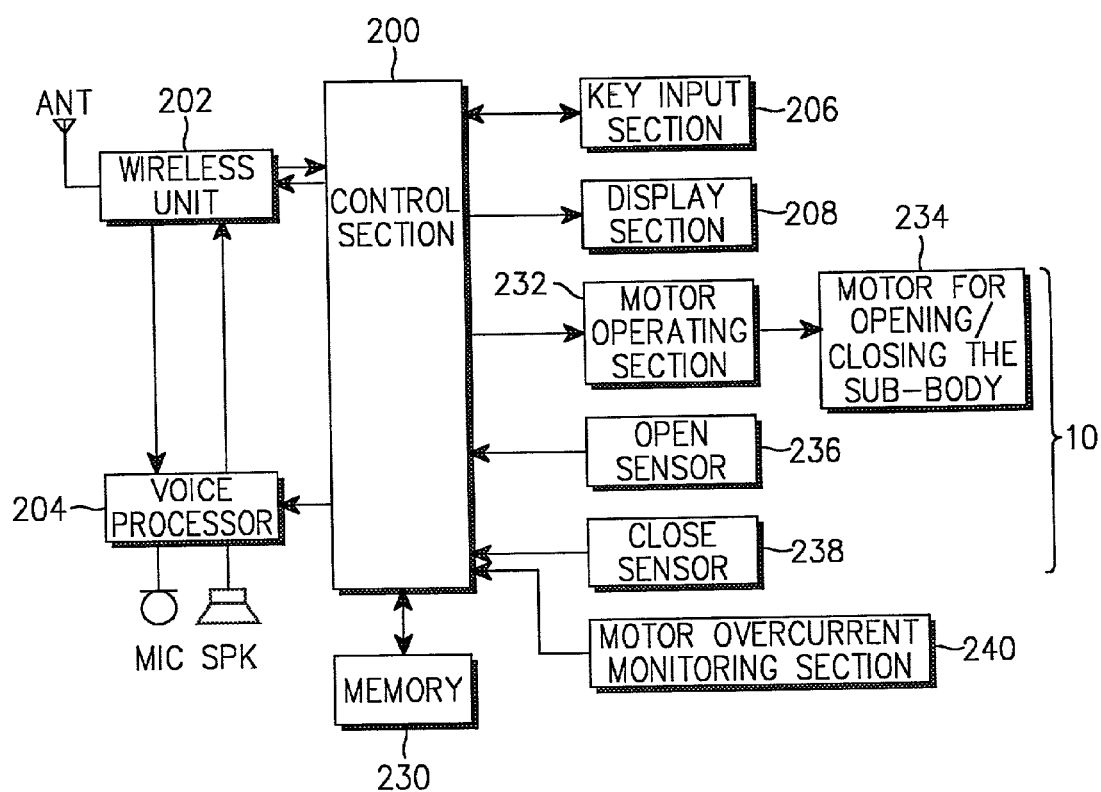
FIG. 2 is a block diagram illustrating a portable wireless terminal in accordance with an embodiment of the present invention.

FIG. 2 is a schematic block diagram illustrating an automatically and manually folded portable wireless terminal 100 in accordance with an embodiment of the present invention.

Referring to FIG. 2, the control section 200 performs a comprehensive control operation of the portable wireless terminal 100. A wireless section 202 controls transmission and reception of voice data and control data under a control of the control section 200. A voice processor 204 converts the voice data received by the wireless section 202 to an audible sound through a speaker SPK under a control of the control section 200, and outputs the same to make voice signals received from a microphone MIC as voice signals and outputs the voice signals to the wireless section 202. A key input section 206 comprising a number of numerical keys and functional keys mounted on the key pad 160 shown in FIGS. 1A and 1B, as well as an automatic folder opening/closing key 180 mounted on one side surface of the main body 110, outputs the key input data corresponding to the keys pushed by the user to the control section 200. A display section 208 displays a variety of messages under control of the control section 200. A memory 230 comprises a program memory for storing program data required for controlling operation of the portable wireless terminal 100, and a data memory for storing data generated in the course of controlling or operating the portable wireless terminal 100 by the user.

The circuit block of the opening/closing device 10 in FIG. 2 comprises a motor operating section 232, a motor 234 for opening/closing the sub-body, an opening sensor 236, and a closing sensor 238. The motor operating section 232 operates so that the motor 234 for opening/closing the sub-body 120 rotates in clockwise and anti-clockwise directions under a control of the control section 200. The open sensor 236 is for sensing a complete opening of the sub-body 120 from the main body 110. The close sensor 238 is for sensing a complete closing of the sub-body 120 onto the main body 110. The open sensor 236 and the close sensor 238 can be realized as a hall sensor, for example. In that case, the open sensor 236 and the close sensor 238 would be located as follows.

The hall sensor is composed of a hall element and a magnet. The magnet 236a of the hall sensor is provided on a hinge of the opening/closing device 10 as shown in FIG. 1B, while the hall element 236b is provided on the top surface of the main body 110 as shown in FIG. 1B. When the sub-body 120 has been completely opened by the opening/closing device 10, the hall element 236b and the magnet 236a of the open sensor 236 are in contact with each other. As a consequence, the signal sensing a complete opening of the sub-body 120 is outputted to the control section 200. The magnet 238a of the hall sensor in the close sensor 238 is provided on an upper side of the ear piece 140 of the sub-body 120, while the hall element 238b of the hall sensor is provided on the bottom surface of the main body 110 as shown in FIG. 1B. When the sub-body 120 has been completely closed by the opening/closing device 10, the hall element 238b and the magnet 238a of the close sensor 238 are in contact with each other. As a consequence, the signal sensing a complete closing of the sub-body 120 is outputted to the control section 200. If the user of the portable wireless terminal 100 controls automatic opening/closing of the sub-body 120 by means of the automatic folder opening/closing key 180, the control section 200 recognizes the user's control and controls operation of the motor operating section 232 of the opening/closing device 10 so as to automatically open/close the sub-body 120. The motor 234 for opening/closing the sub-body 120 is rotated in clockwise and counter-clockwise directions under a control of operation by the control section 200.

Also, according to an embodiment of the present invention, the circuit block of the opening/closing device 10 comprises a motor overcurrent monitoring section 240 as shown in FIG. 2. The motor overcurrent monitoring section 240 monitors whether or not overcurrent is applied to the, motor 234 for opening/closing the sub-body 120 in accordance with the overcurrent of the motor 234 for opening/closing of the sub-body 120, and supplies the monitored result to the control section 200.

Figure 3:
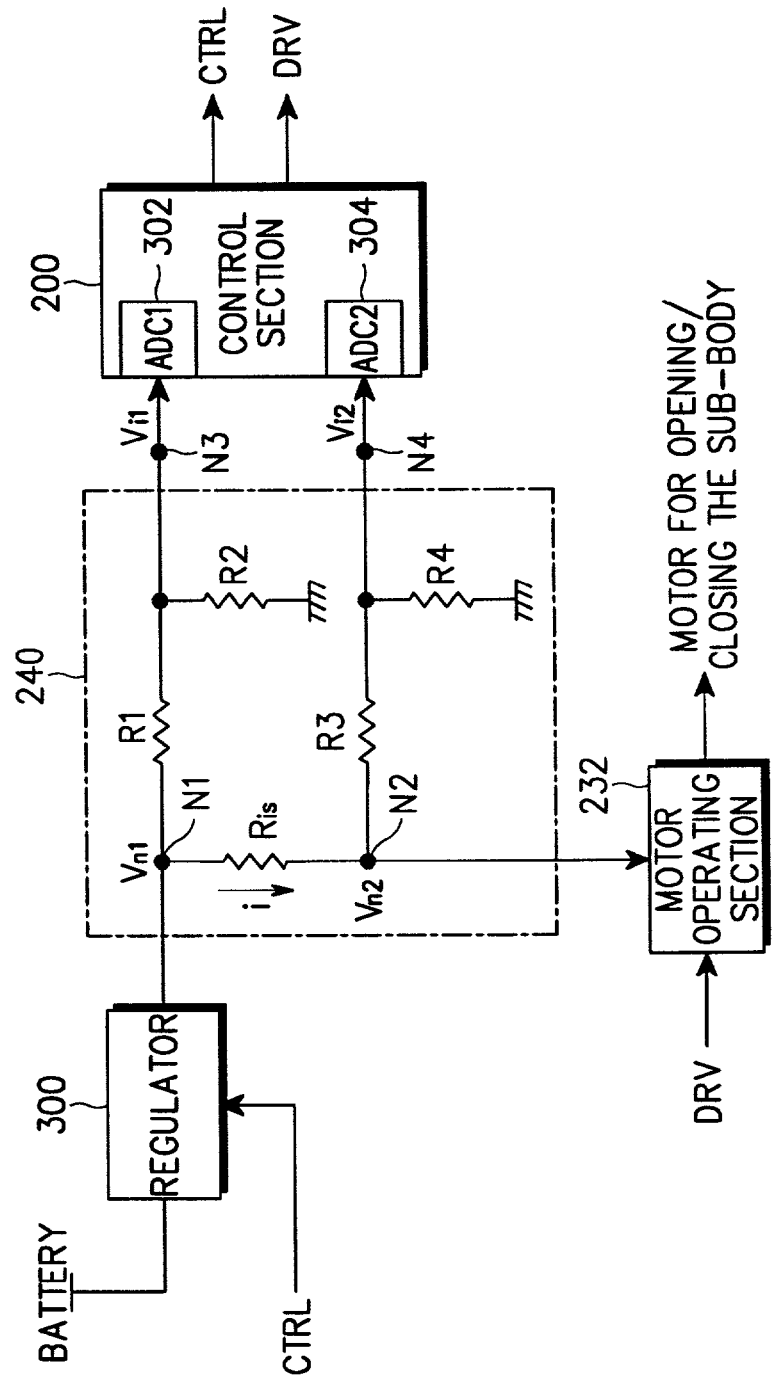
FIG. 3 is a block diagram illustrating a device to sense an overload of a motor for opening/closing the sub-body according to an embodiment of the present invention.

FIG. 3 is a block diagram illustrating a device to sense overload of a motor for opening/closing of the sub-body according to an embodiment of the present invention. FIG. 3 includes a detailed circuit construction of the motor overcurrent monitoring section 240. Referring to FIG. 3, the motor overcurrent monitoring section 240 is located between the control section 200 and a regulator 300 connected to a battery. To describe the detailed circuit construction of the motor overcurrent monitoring section 240, the output line of a regulator 300 is connected to an ADC1 (analog to digital converter) 302 through a node N1, a resistor R1 and a node N3. An end of a resistor R2, on which another end thereof is grounded, is connected to the resistor R1 and the node N3. The node N1 is connected to the motor operating section 232 through a node N2. The node N2 is connected to an ADC2 304 of the control section 200 through the resistor R3 and a node N4. An end of a resistor R4, on which another end thereof is grounded, is connected to the resistor R3 and the node N4.

If defining the voltage of the node N1 to be Vn1, the voltage of the node N3 to be Vi1, the voltage of the node N2 to be Vn2, and the voltage of the node N4 to be Vi2, the voltage Vi1 of the node N3 is calculated by the following Equation 1.

$$Vi1 = \frac{R2}{R1+R2} \times Vn1 \qquad \text{[Equation 1]}$$

The voltage Vi2 of the node N4 is calculated by the following Equation 2.

$$Vi2 = \frac{R3}{R3+R4} \times Vn2 \qquad \text{[Equation 2]}$$

The voltage Vn2 of the node N2d is calculated by the following Equation 3.

$$Vn2 = Vn1 - i \times Ris \qquad \text{[Equation 3]}$$

In the Equation 3, i signifies the current flowing through a current sensing resistor Ris.

If the sub-body 120 does not move due to a certain factor despite the user's control of an automatic opening/closing of the sub-body 120, overcurrent is loaded on the motor 234 for opening/closing the sub-body 120. In other words, the current i flowing through the current sensing resistor Ris becomes overcurrent (the current relatively much greater than the current in normal operation of the motor).

Figure 7:
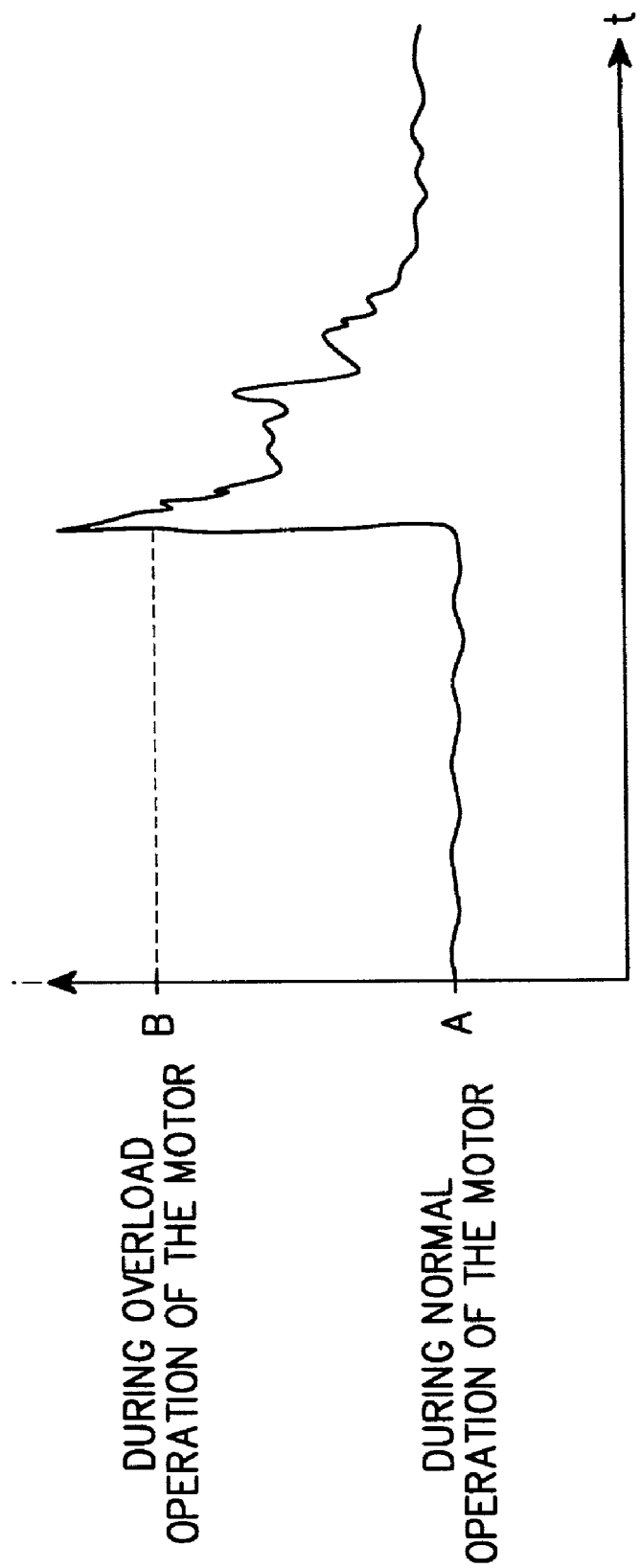
FIG. 7 is a graph illustrating characteristics of the current during overload and normal operation of the motor for opening/closing the sub-body.

FIG. 7 shows a current profile B flowing through the current sensing resistor Ris when overload is laid on the motor 234 for opening/closing the sub-body 120, and a current profile A flowing through the current sensing resistor Ris when the motor 234 for opening/closing the sub-body 120 is in normal operation. If overcurrent flows through the current sensing resistor Ris, the voltage difference between the node N1 and the node N2 becomes much greater than when the sub-body 120 is in normal operation. Likewise, the voltage difference between the node N3 and the node N4 becomes much greater than when the sub-body 120 is in normal operation.

Figure 6:
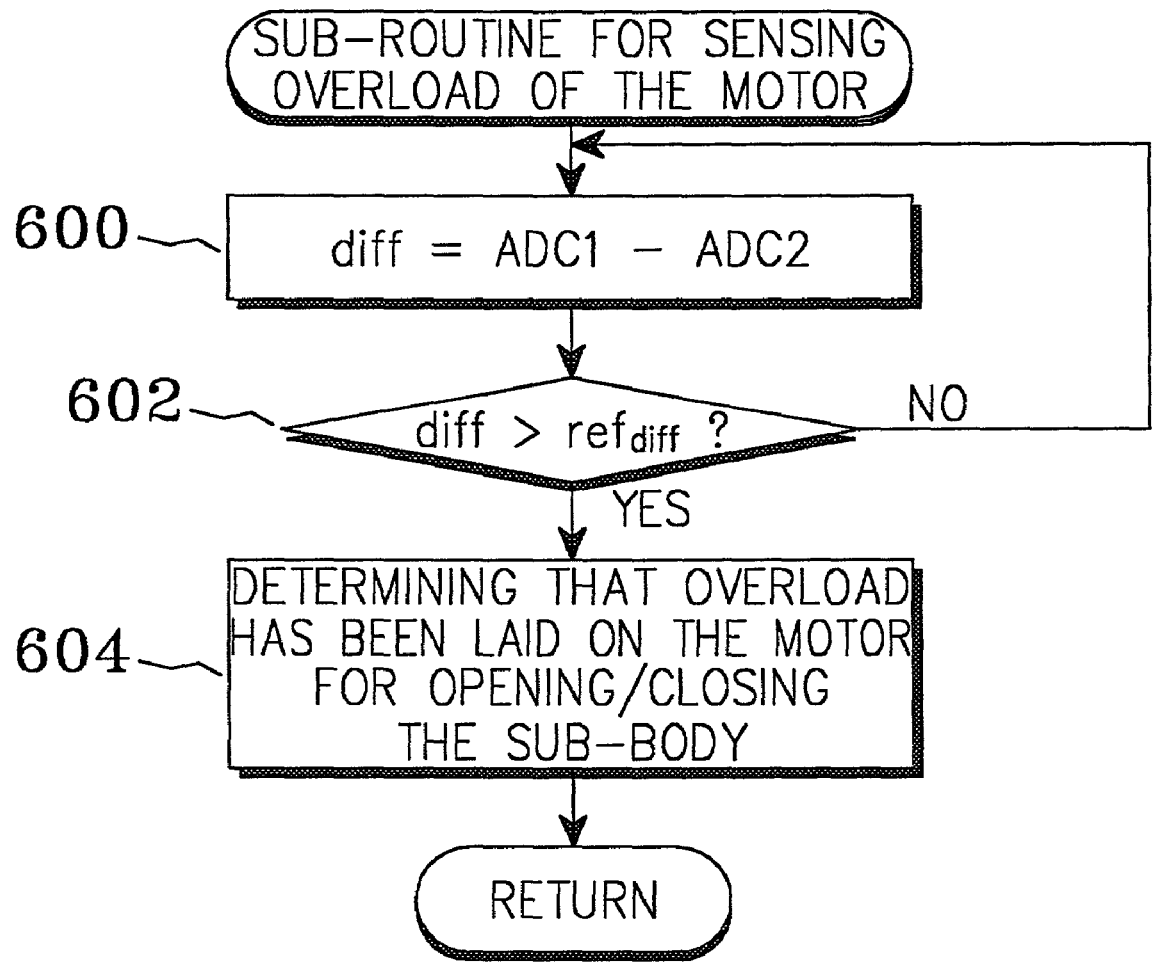
FIG. 6 is a flow chart illustrating a sub-routine for sensing an overload of the motor by a control section 200.

The voltage Vi1 of the node N3 and the voltage Vi2 of the node N4 are applied to the control section 200, respectively. The control section 200 converts the voltage Vi1 and the voltage Vi2 to digital values ADC1 and ADC2, respectively, by means of the ADC1 302 and the ADC2 304. As in the motor overload sensing sub-routine as shown in FIG. 6, the difference diff value between the ADC1 and ADC2 is obtained in step 600. The control section 200 compares the diff value with the pre-set reference difference value $ref_{diff}$ in step 602 of FIG. 6. The pre-set reference difference value $ref_{diff}$ is a difference value defining a reference for determining whether or not the motor 234 for opening/closing the sub-body 120 is on overload. The reference difference value $ref_{diff}$ is preferably set to be 1.2 times or 1.5 times the difference value when the motor 234 for opening/closing the sub-body 120 is in normal operation. If the difference value is greater than the pre-set value $ref_{diff}$, the control section 200 proceeds with step 604 to determine that overload is laid on the motor 234 for opening/closing the sub-body 120. The control section 200 applies a CTRL signal, which disables the regulator 300, to the regulator 300 when controlling the motor 234 to cease operation. Subsequently, the regulator 300 is disabled, and the power supply to the motor operating section 232 is interrupted.

Figure 4:
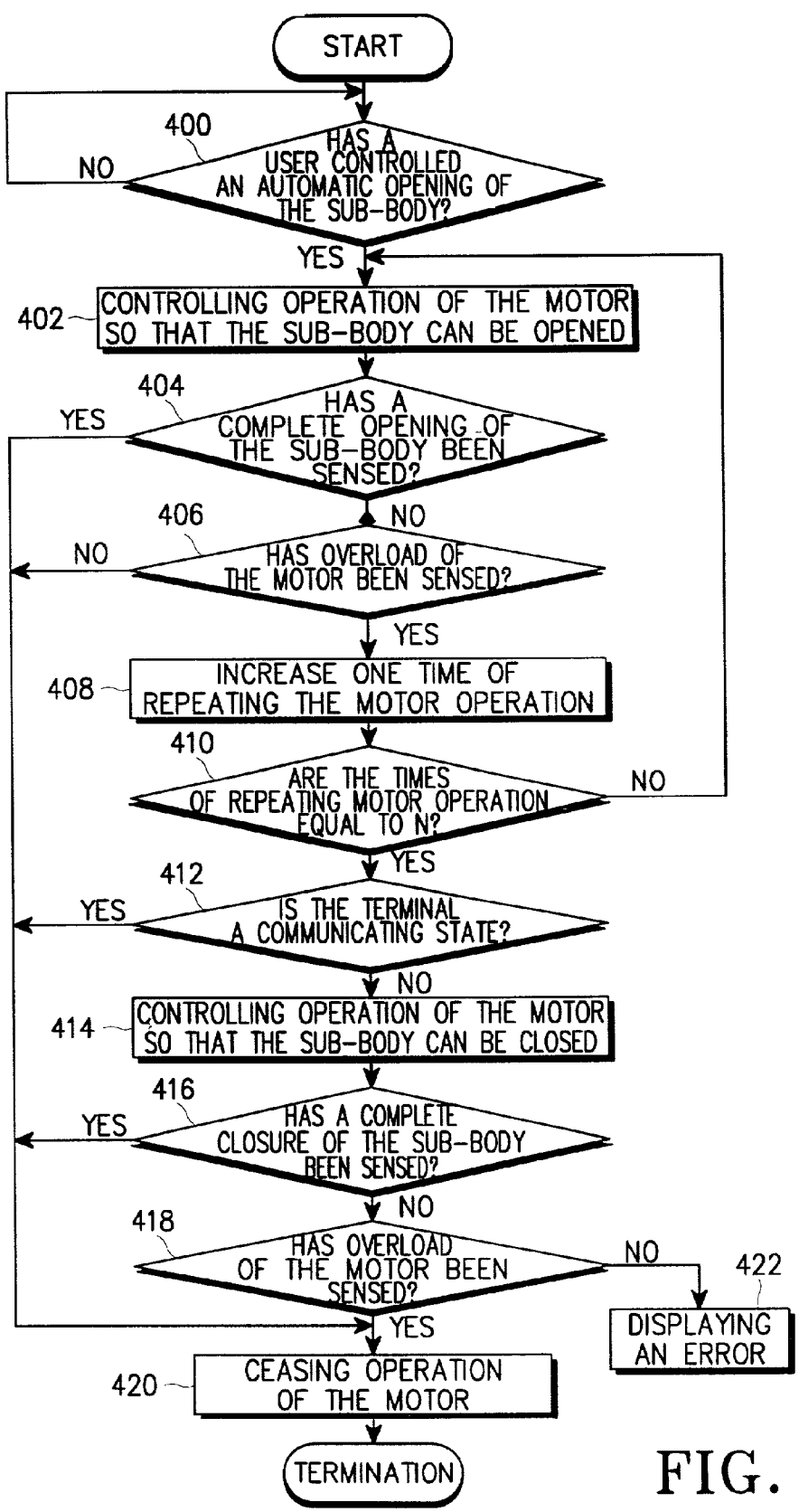
FIG. 4 is a flow chart illustrating a control of automatic opening of the sub-body according to an embodiment of the present invention.
Figure 5:
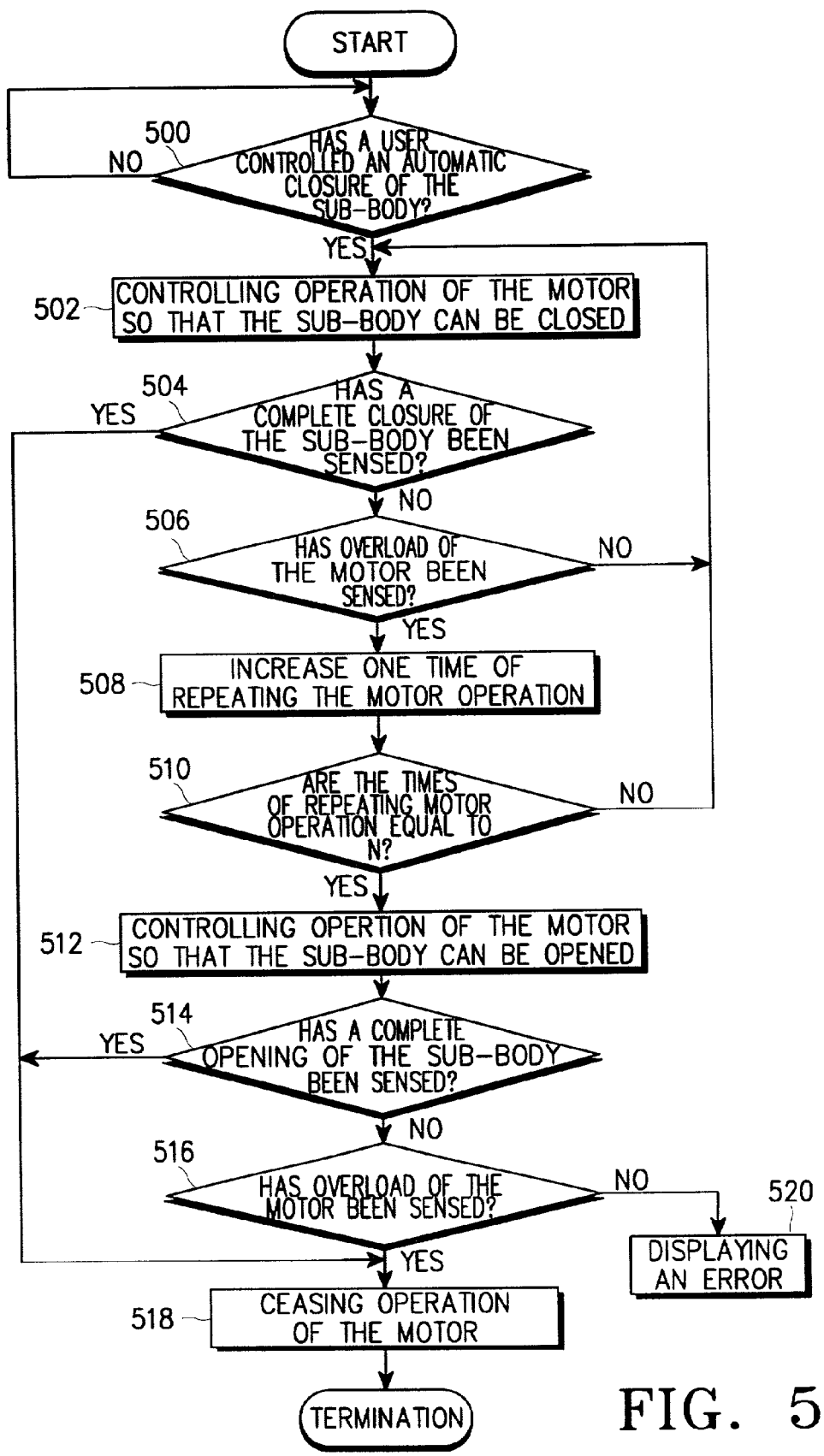
FIG. 5 is a flow chart illustrating a control of automatic closing of the sub-body according to an embodiment of the present invention.

FIGS. 4 and 5 illustrate an example of controlling an operation, to which sensing of overload of the motor for opening/closing the sub-body 120 according to an embodiment of the present is applicable.

FIG. 4 is a flow chart illustrating a control of automatic opening of the sub-body according to an embodiment of the present invention, and FIG. 5 is a flow chart illustrating a control of automatic closing of the sub-body according to an embodiment of the present invention.

The basic function of the embodiment of the present invention illustrated in FIGS. 4 and 5 is that, when the user automatically opens/closes the sub-body 120, incomplete opening/closing of the sub-body 120 is detected by means of the open sensor 236, close sensor 238, and the overcurrent sensing circuit section 240. Controls of automatic opening/closing are repeatedly performed as many times as pre-set. If the opening/closing is incomplete despite the repeated controls of automatic opening/closing as many times as pre-set, the sub-body 120 is returned to the initial state.

An operation according to an embodiment of the present invention will now be described in detail with reference to FIGS. 1A, 1B, and 2 thru 5.

The operation, when the user automatically opens the sub-body 120 according to an embodiment of the present invention, will first be described with reference to FIG. 4. If the user controls automatic opening of the sub-body 120 as shown in FIG. 4, the control section 200 determines the same in step 400 of FIG. 4, and proceeds with step 402. If the user pushes the automatic folder opening/closing key 180, the control section 200 receives the key data corresponding to the push of the automatic folder opening/closing key 180 so as to recognize control of the automatic opening. In step 402, the control section 200 controls operation of the motor so that the sub-body 120 can be opened from the main body 110. In other words, the control section 200 allows opening of the sub-body 120 from the main body 110 by controlling the motor operating section 232 to rotate the motor 234 for opening/closing the sub-body 120 in a counter-clockwise direction.

In step 404 of FIG. 4, the control section 200 determines whether or not a signal sensing a complete opening of the sub-body 120 has been received from the open sensor 236. In the affirmative, the control section 200 proceeds with step 420 of FIG. 4 to cease operation of the motor 234 for opening/closing of the sub-body 120. If in the negative, the control section 200 proceeds with step 406 to determine whether or not the open sensor 236 has sensed an overload of the motor 234. The control of sub-routine by the control section 200 for determining sensing of an overload of the motor 234 is described with reference to FIG. 6. The sensing of the overload means, for instance, that a physical factor such as the user intentionally holding the sub-body 120 affects the opening/closing of the sub-body 120.

If overload of the motor 234 is sensed in step 406, the control section 200 proceeds with step 408 of FIG. 4 to increase the times of repeating the motor operation from the initial value (0) to 1. To increase the times of repeating the motor operation, a counter provided inside of the motor is available according to an embodiment of the present invention. Thereafter, the control section 200 determines whether or not the times of repeating operation of the motor is a pre-set N (N is a natural number) in step 410. If the times of repeating operation of the motor are determined to be less than N, the control section 200 returns to step 402 to re-perform the operation.

If the times of repeating operation of the motor are determined to be equal to the pre-set N in step 410, the control section 200 proceeds with step 412 to determine whether or not the terminal is in communicating state. In the affirmative, the control section 200 proceeds with step 420 of FIG. 4 to cease operation of the motor. This is not to interrupt communication already started even if the sub-body 120 has been incompletely opened. In the negative in step 412, the control section 200 proceeds with step 414 to control the motor operating section 232 to close the sub-body. In other words, the control section 200 allows closing of the sub-body 120 onto the main body 110 by controlling the motor operating section 232 to rotate the motor 234 for opening/closing the sub-body 120 in a clockwise direction.

Thereafter, the control section 200 proceeds with step 416 to determine whether or not a signal sensing a complete closing of the sub-body 120 has been received from the close sensor 238. In the affirmative, the control section 200 proceeds with step 420 of FIG. 4 to cease operation of the motor 234 for opening/closing the sub-body 120. In the negative in step 416, the control section 200 proceeds with step 418 to determine whether or not the close sensor 238 has sensed overload of the motor. In the affirmative, the control section 200 proceeds with step 420 to cease operation of the motor 234 for opening/closing the sub-body 120. In the negative in step 418, it means that the sensor or the motor is in abnormal state. Therefore, the control section 200 displays an error on a display section by proceeding with step 422.

An operation will now be described in detail with reference to FIG. 5 when the user automatically closes the sub-body 120 according to an embodiment of the present invention.

If the user controls an automatic closing of the sub-body 120, the control section 200 determines the same in step 500 of FIG. 5 to proceed with step 502. In step 502, the control section 200 controls operation of the motor so that the sub-body 120 can be closed onto the main body 110. In other words, the control section 200 allows closing of the sub-body 120 onto the main body 110 by controlling operation of the motor operating section 232 to rotate the motor 234 for opening/closing the sub-body 120 in a clockwise direction.

Thereafter, the control section 200 determines in step 504 whether or not a signal sensing complete closing of the sub-body has been received from the close sensor 238. In the affirmative, the control section 200 proceeds with step 518 to cease operation of the motor 234 for opening/closing the sub-body 120. In the negative in step 504, the control section 200 proceeds with step 506 to determine whether or not the close sensor 238 has sensed overload of the motor 234 for opening/closing of the sub-body 120. The control of the sub-routine by the control section 200 for determining sensing of overload of the motor is as described with reference to FIG. 6. The sensing of the overload means, for instance, that a physical factor such as the user intentionally holding the sub-body 120 affects the sub-body 120.

If overload of the motor 234 is sensed in step 506, the control section 200 proceeds with step 508 of FIG. 4 to increase the times of repeating the motor operation from the initial value (0) to 1. Thereafter, the control section 200 determines whether or not the times of repeating operation of the motor is a pre-set N (N is a natural number) in step 510. If the times of repeating operation of the motor are determined to be less than N, the control section 200 returns to step 502 to re-perform the operation.

If the times of repeating operation of the motor are determined to be equal to the pre-set N in step 510, the control section 200 controls the sub-body 120 to be in the initial state, i.e., to be opened. The control section 200 allows opening of the sub-body 120 from the main body 110 by controlling the motor operating section 232 to rotate the motor 234 for opening/closing the sub-body 120 in a counter-clockwise direction, as indicated by step 512. In step 514 of FIG. 5, the control section 200 determines whether or not a signal sensing a complete opening of the sub-body 120 has been received from the open sensor 236. In the affirmative, the control section 200 proceeds with step 518 of FIG. 5 to cease operation of the motor 234 for opening/closing of the sub-body 120.

In the negative in step 514, the control section 200 proceeds with step 516 to determine whether or not the open sensor 236 has sensed overload of the motor 234. In the affirmative, the control section 200 proceeds with step 518 of FIG. 5 to cease operation of the motor 234 for opening/closing of the sub-body 120. In the negative in step 516, it means that the sensor or the motor is in abnormal state. Therefore, the control section 200 displays an error on a display section by proceeding with step 520.

The inventor of the present invention has conducted a test with two sample terminals by affecting a physical factor to the sub-body 120 to lay overload on the motor 234 for opening/closing the sub-body 120 while the control section 200 controls opening and closing of the sub-body 120.

FIG. 8 is a graph illustrating a profile of the test result according to an embodiment of the present invention. In FIG. 8, the transversal axis represents time, and the longitudinal axis represents a difference diff value between the digital values ADC1 and ADC2 outputted from the ADC1 302 and ADC2 304,respectively. Also,the symbol ■ signifies a profile when controlling opening of the sub-body 120 of the sample terminal 1, while the symbol ● signifies a profile when controlling closing of the sub-body 120 of the sample terminal 1. The symbol □ signifies a profile when controlling opening of the sub-body 120 of the sample terminal 2, while the symbol ○ signifies a profile when controlling closing of the sub-body 120 of the sample terminal 2.

Referring to an example of the profile of the diff value shown in FIG. 8, the diff value of the period from the point of time when overload is applied to the motor for opening/closing the sub-body 120 was observed to be greater than 1.2–1.5 times in comparison with the diff value during the period of normal operation of the motor 234 for opening/closing the sub-body 120. Based on the diff value as stated above, the control section 200 senses an overload of the motor.

As described above, the present invention performs an effective control of automatic opening/closing of a sub-body by using an open sensor, close sensor and motor overload sensing, etc. in an automatically and manually folded portable wireless terminal.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An automatically and manually folded portable wireless terminal having at least a main body and a sub-body installed on the main body so as to be opened and closed, comprising:
   a first sensor for sensing a complete opening of the sub-body from the main body;
   a second sensor for sensing a complete closing of the sub-body onto the main body;
   an opening/closing device for opening/closing the sub-body in accordance with a control of opening/closing of the sub-body and having a motor housed inside of the terminal;
   a motor overcurrent monitoring section having a current sensing resistor located between a first node and a second node determining an overload condition of the motor based on a difference between a first voltage applied to the first node and a second voltage applied to the second node for monitoring current flow to the motor to determine an overload condition of the motor; and
   a control device for controlling operation of the motor in accordance with the overload condition as determined by the motor overcurrent monitoring section when complete opening/closing of the sub-body is sensed by the first and the second sensors when the opening/closing device automatically opens/closes the sub-body, and after at least one additional cycle of the motor after an overload condition is determined.

2. The automatically and manually folded portable wireless terminal of claim 1, wherein the motor overcurrent monitoring section comprises:
   the first node connected to a battery output line for applying the first voltage corresponding to the battery voltage to a first input end of the control device;
   the second node connected between the first node and the motor for applying the second voltage, which corresponds to a current supplied to the motor, to a second input end of the control device; and
   the current sensing resistor located between the first node and the second node sensing the current supplied to the motor from the first node through the second node.

3. A method for controlling opening/closing of a sub-body in a foldable portable wireless terminal having at least a main body, a sub-body installed on the main body so as to be openable and closable, a first sensor installed in the main body for sensing a complete opening of the sub-body from the main body, and a second sensor installed in the main body and the sub-body for sensing a complete closing of the sub-body onto the main body, the method comprising the steps of:
   determining whether or not a complete opening/closing of the sub-body is sensed by the first and the second sensors during automatic opening/closing of the sub-body;
   determining an overload condition of a motor housed inside of the terminal based on current supplied to the motor if incomplete opening/closing of the sub-body is sensed by using a current sensing resistor located between a first node and a second node and determining an overload condition of the motor based on a difference between a first voltage applied to the first node and a second voltage applied to the second node; and
   controlling operation of the motor in accordance with the determined overload condition, and after at least one additional cycle of the motor after an overload condition is determined.

4. The method of claim 3, wherein the determination of the overload condition of the motor is made based on a voltage difference corresponding to a current difference between the current supplied to the motor in normal operation and the current supplied to the motor in the overload condition.

5. A method for controlling opening/closing of a sub-body in a foldable portable wireless terminal having a main body and a sub-body installed on the main body so as to be openable and closable, the method comprising the steps of:
   operating a motor for automatically opening/closing the sub-body in accordance with an input by a user;
   determining an overload condition of the motor for opening/closing the sub-body based on a voltage difference corresponding to a current difference between the current supplied to the motor in a normal operation and the current supplied to the motor in the overload condition by using a current sensing resistor located between a first node and a second node and determining an overload condition of the motor based on a difference between a first voltage applied to the first node and a second voltage applied to the second; and
   controlling operation of the motor for opening/closing the sub-body in accordance with the determined overload condition, and after at least one additional cycle of the motor after an overload condition is determined.

6. A method for controlling opening/closing of a sub-body in a foldable portable wireless terminal having at least a main body, a sub-body installed on the main body so as to be openable and closable, a first sensor for sensing a complete opening of the sub-body from the main body, and a second sensor for sensing a complete closing of the sub-body onto the main body, the method comprising the steps of:
   determining an overloaded state of a motor housed inside of the terminal based on the current supplied to the housed motor if incomplete opening/closing of the sub-body is sensed by using a current sensing resistor located between a first node and a second node and determining an overload condition of the motor based on a difference between a first voltage applied to the first node and a second voltage applied to the second node;
   controlling opening/closing of the sub-body repeatedly as many times as predetermined if incomplete opening/closing of the sub-body has been sensed and the housed motor is in an overloaded state; and
   returning the sub-body to an initial state if incomplete opening/closing of the sub-body is sensed and the overloaded state continues after at least one additional cycle of the motor.

7. A method for controlling opening/closing of a sub-body in an automatically and manually folded portable wireless terminal having at least a main body, a sub-body installed on the main body so as to be openable and closable, and a sensor for sensing a complete opening of the sub-body from the main body, the method comprising the steps of:

determining whether or not the sensor senses a complete opening of the sub-body during automatic opening;

determining an overloaded state of a motor housed inside of the terminal based on current supplied to the housed motor if incomplete opening is sensed by the sensor and by using a current sensing resistor located between a first node and a second node and determining an overload condition of the motor based on a difference between a first voltage applied to the first node and a second voltage applied to the second node;

controlling opening of the sub-body as many times as predetermined if incomplete opening is sensed and the housed motor is determined to be in an overloaded state; and ceasing operation of the housed motor if incomplete opening of the sub-body is sensed and the overloaded state of the housed motor continues after at least one additional cycle of the motor.

* * * * *